(12) United States Patent
Saleem et al.

(10) Patent No.: US 10,476,836 B1
(45) Date of Patent: Nov. 12, 2019

(54) SYSTEMS, DEVICES, AND METHODS FOR PROVIDING IMPROVED RDAP OPERATIONS

(71) Applicant: VERISIGN, INC., Reston, VA (US)

(72) Inventors: Yasir Saleem, Ashburn, VA (US); Kriparam Faraday, Columbia, MD (US); Gaurav Sharma, Leesburg, VA (US)

(73) Assignee: VERISIGN, INC., Reston, VA (US)

( * ) Notice: Subject to any disclaimer, the term of this patent is extended or adjusted under 35 U.S.C. 154(b) by 227 days.

(21) Appl. No.: 15/485,993

(22) Filed: Apr. 12, 2017

(51) Int. Cl.
   *G06F 15/173* (2006.01)
   *H04L 29/12* (2006.01)
   *H04L 29/08* (2006.01)
   *G06F 21/00* (2013.01)

(52) U.S. Cl.
   CPC ...... *H04L 61/1511* (2013.01); *H04L 61/2007* (2013.01); *H04L 61/3015* (2013.01); *H04L 67/1097* (2013.01)

(58) Field of Classification Search
   USPC .......................... 709/220, 223, 245, 224, 203
   See application file for complete search history.

(56) References Cited

U.S. PATENT DOCUMENTS

| | | | | |
|---|---|---|---|---|
| 2002/0091703 | A1* | 7/2002 | Bayles | G06Q 40/04 |
| 2004/0015584 | A1* | 1/2004 | Cartmell | H04L 29/12009 709/225 |
| 2004/0172463 | A1* | 9/2004 | King | H04L 29/12009 709/223 |
| 2006/0018300 | A1* | 1/2006 | Westberg | H04L 63/0272 370/351 |
| 2008/0071909 | A1* | 3/2008 | Young | G06Q 30/08 709/226 |
| 2010/0274970 | A1* | 10/2010 | Treuhaft | H04L 29/12066 711/118 |
| 2011/0060950 | A1* | 3/2011 | Waldron | G06F 11/1451 714/48 |
| 2012/0173681 | A1* | 7/2012 | Gould | H04L 29/12066 709/221 |
| 2012/0173685 | A1* | 7/2012 | Shorter | H04L 29/12066 709/223 |

(Continued)

OTHER PUBLICATIONS

Andrew Allemann, "CIRA wants patent for registry "tag" system", Apr. 12, 2018, Retrieved from the Internet: https://domainnamewire.com/2018/04/12/cira-wants-patent-for-registry-tag-system/, pp. 1-3.

*Primary Examiner* — Jude Jean Gilles
(74) *Attorney, Agent, or Firm* — MH2 Technology Law Group, LLP

(57) ABSTRACT

Embodiments relate to systems, devices, and computing-implemented methods for providing improved domain data operations by receiving, from a device, a request for domain data associated with a domain name (e.g., RDAP domain data); transmitting a domain data request to a domain data server associated with a domain name registry corresponding to the domain name; receiving a domain data response from the domain data server that includes primary domain data associated with the domain name; obtaining supplementary domain data associated with the domain name; generating merged domain data by merging the primary domain data with the supplementary domain data; and transmitting the merged domain data to the device.

20 Claims, 7 Drawing Sheets

(56) References Cited

U.S. PATENT DOCUMENTS

| | | | |
|---|---|---|---|
| 2012/0315037 A1* | 12/2012 | Smith | H04L 45/02 398/45 |
| 2014/0032589 A1* | 1/2014 | Styler | G06Q 10/107 707/767 |
| 2014/0101194 A1* | 4/2014 | Arians | G06Q 10/08 707/769 |
| 2015/0213131 A1* | 7/2015 | Styler | H04L 61/1511 707/767 |
| 2015/0237001 A1* | 8/2015 | Ivanov | H04L 61/2007 709/245 |
| 2016/0119282 A1* | 4/2016 | Bladel | H04L 61/302 709/203 |
| 2016/0171115 A1* | 6/2016 | Jheeta | G06F 16/9535 707/723 |
| 2017/0195286 A1* | 7/2017 | Stahura | H04L 61/1511 |
| 2017/0331782 A1* | 11/2017 | Lai | G06F 16/955 |
| 2017/0331783 A1* | 11/2017 | Lai | H04L 67/02 |
| 2017/0331786 A1* | 11/2017 | Lai | H04L 61/3025 |
| 2018/0103008 A1 | 4/2018 | Slaunwhite et al. | |

* cited by examiner

SYSTEMS, DEVICES, AND METHODS FOR PROVIDING IMPROVED RDAP OPERATIONS

BACKGROUND

The Domain Name System ("DNS") is the part of the Internet infrastructure that translates human-readable domain names into the Internet Protocol ("IP") numbers needed to establish TCP/IP communication over the Internet. DNS allows users to refer to web sites, and other resources, using easier to remember domain names, such as "www.example.com", rather than the numeric IP addresses associated with a website, e.g., 123.4.56.78, and assigned to computers on the Internet. Each domain name can be made up of a series of character strings (e.g., labels) separated by dots. The right-most label in a domain name is known as the top-level domain ("TLD"). Examples of well-known TLDs are "com"; "net"; "org"; and the like. Each TLD supports second-level domains, listed immediately to the left of the TLD, e.g., the "example" level in "www.example.com". Each second-level domain can include a number of third-level domains located immediately to the left of the second-level domain, e.g. the "www" level in www.example.com.

The responsibility for operating each TLD, including maintaining a registry of the second-level domains within the TLD, can be delegated to a particular organization, known as a domain name registry ("registry"). The registry is primarily responsible for answering queries for IP addresses associated with domains ("resolving"), typically through DNS servers that maintain such information in large databases, and operating its top-level domain.

In some instances, in order to obtain a domain name, that domain name is registered with a registry through a domain name registrar, an entity accredited by the Internet Corporation for Assigned Names and Numbers (ICANN) and authorized to register Internet domain names on behalf of end-users.

Generally, when a domain name is registered, domain data, such as registrant contact information, administrative contact information, technical contact information, register information, current status, date of creation, date of last update, date of registration expiration, and name server addresses, is stored in a database that can be queried. Many current systems use the WHOIS protocol to store and deliver domain data to requesters. However, an alternative to WHOIS, Registration Data Access Protocol (RDAP), may soon replace the use of WHOIS in many systems.

RDAP provides several advantages over WHOIS, including a standardization of requests and responses, internationalization considerations to cater to languages other than English, and redirection capabilities to allow seamless referrals to other registries. However, RDAP is currently limited in the domain data that can be stored and delivered to requesters and in the amount of control that the entity that owns the domain ("registrant") has over who can access certain domain data.

Therefore, systems, methods, and computer-readable media are desirable that can provide improved RDAP operations.

SUMMARY

The present disclosure relates to systems, devices, and methods for providing improved domain data operations by receiving, from a device, a request for domain data associated with a domain name; transmitting a domain data request to a domain data server associated with a domain name registry corresponding to the domain name; receiving a domain data response from the domain data server that includes primary domain data associated with the domain name; obtaining supplementary domain data associated with the domain name; generating merged domain data by merging the primary domain data with the supplementary domain data; and transmitting the merged domain data to the device.

In some embodiments, the domain data operations can further include receiving, from a second device, a set of supplementary domain data that includes the supplementary domain data; receiving indications that at least one item of domain data in the set of supplementary domain data is public domain data and at least one item of domain data in the set supplementary domain data is privileged domain data; receiving authentication information associated with the domain name; transmitting a registrant authentication request that includes the authentication information to a domain name registrar; receiving a response to the registrant authentication request; and provisioning the supplementary domain data based on the response indicating that the second device is authenticated.

In further embodiments, the request for domain data can be a thin request, the supplementary domain data that is obtained can include public domain data, and the domain data request transmitted to the domain data server can be a thin domain data request.

In other embodiments, the request for domain data can be a thick request, the supplementary domain data that is obtained can include public domain data and privileged domain data, and the domain data request transmitted to the domain data server can be a thick domain data request.

In still further embodiments, the domain data operations can further include receiving, from the second device, first authorization information, where: the request for domain data includes second authorization information; obtaining the supplementary domain data associated with the domain name is in response to determining that the first authorization information matches the second authorization information; and transmitting the domain data request to the domain data server is in response to determining that the first authorization information matches the second authorization information.

In some implementations, the request for domain data can be a request for RDAP domain data, and the domain data server can be an RDAP server.

In further implementations, at least one of the domain data request from the domain data server, the supplementary domain data, and the merged domain data can be files in the JSON format.

In other implementations, the supplementary domain data associated with the domain name can be obtained by a server from a database located on the server or from a database that is external to the server, via representational state transfer web services.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

Figure 1:
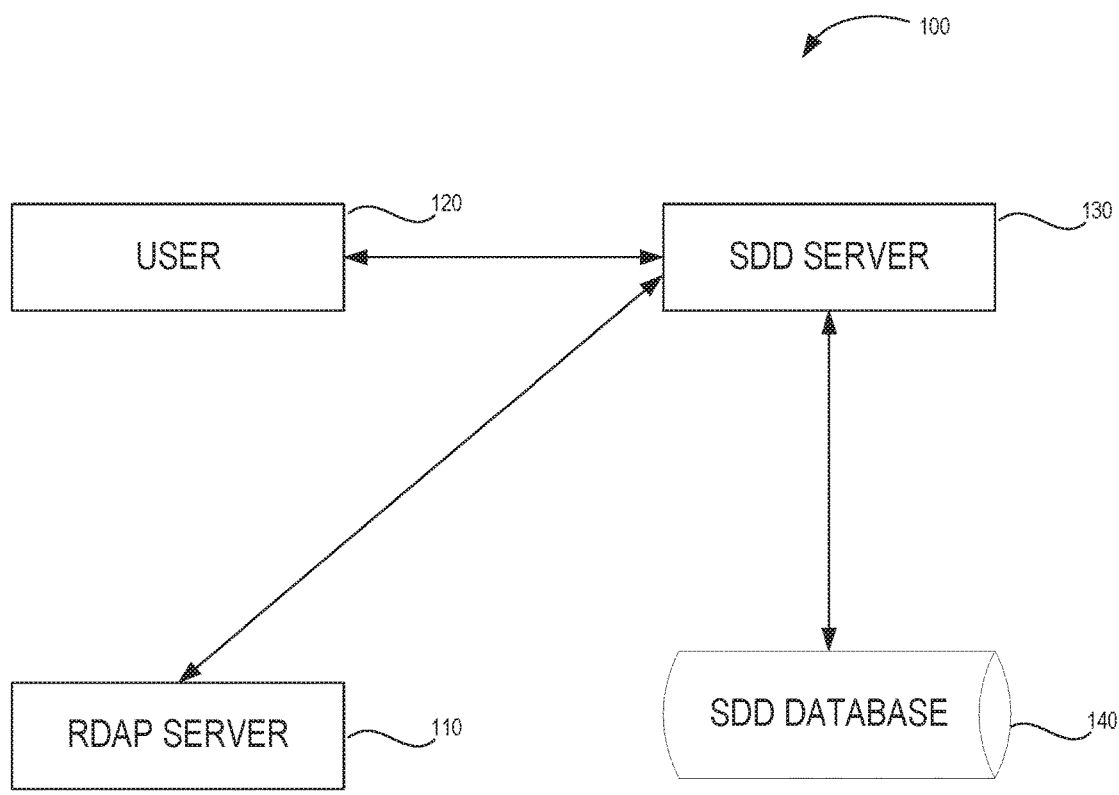
FIG. 1 is a diagram illustrating an example of a system for responding to requests for domain data, consistent with certain disclosed embodiments.

The following detailed description refers to the accompanying drawings. Wherever convenient, the same reference numbers are used in the drawings and the following description to refer to the same or similar parts. While several examples of embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

In general, domain name registrars control which specific items of domain data are made available using WHOIS/RDAP and provide limited options regarding controlling access to the domain data. In other words, the registrant (i.e., the owner of the domain name) cannot expose domain data that is supplementary to the data made available by the registrar and cannot fully control access to domain data.

Therefore, the registrant would have limited options available to provision supplementary domain data, such as posting the supplementary domain data on their website, individually receiving and responding to messages that request the supplementary domain data, etc. However, requesters of the supplementary domain data may not be aware that the supplementary domain data is located on the registrant's website and/or may not know that the registrant would provide that domain data by responding to a direct inquiry. Thus, the requesters may waste time, as well as processing and networking resources searching for the data using WHOIS/RDAP, via requests to access the registrant's website, via internet searches, via direct inquiries to the registrant, etc. Additionally, time, processing resources, and networking resources of the registrant are wasted through extraneous requests to access the registrant's website for information that may or may not be there and though responding to individual inquiries.

As discussed herein, supplementary domain data can be provisioned on a supplementary domain data (SDD) server and database. In various embodiments, the SDD server can respond to requests for domain data by verifying that the requester has authorization to request the domain data if the domain data is privileged, retrieving primary domain data from an RDAP server, obtaining supplementary domain data from an SDD database, and merging the primary domain data with the supplementary domain data.

In further embodiments, the supplementary domain data can be provisioned at the SDD server by receiving the supplementary domain data (e.g., from the registrant) and confirming that the source of the supplementary domain data is authenticated (e.g., confirming that the registrant is actually the registrant for the domain name associated with the supplementary domain data). In some implementations, the source of the supplementary domain data can be authenticated by communicating with a domain name registrar associated with the domain name. If the source is authenticated, the SDD server can provision the supplementary domain data (e.g., on an SDD database). In further embodiments, the source of the supplementary domain data may also set varying levels of access permissions for all or part of the supplementary domain data. For example, part of the supplementary domain data can be set to public, where public domain data is available to all requesters, and part of the supplementary domain data can be set to privileged, where privileged domain data is available to requesters that are authorized.

Therefore, through the use of an SDD server and database, supplementary domain data can be provisioned and merged with primary domain data, thereby reducing the processing and networking resources required to access all of the domain data. Additionally, unlike previous RDAP systems, the registrants may have full control over access permissions of individual items of the supplementary domain data.

Embodiments disclosed herein may be described as using RDAP to provide domain data associated with domain names. However, consistent with disclosed embodiments, query and response protocols other than RDAP may be used, such as, for example, WHOIS. Additionally, consistent with disclosed embodiments, the query and response protocols described herein may be used to store and provide any type of database content, and, accordingly, the database content is not limited to domain data.

FIG. 1 is a diagram illustrating an example of a system 100 for responding to requests for domain data, consistent with certain disclosed embodiments. The system 100 can include a user device 120, an RDAP server 110, an SDD server 130, and an SDD database 140.

In some implementations, the user device 120 can represent one or more computing devices. For example, the user device 120 can represent one or more webservers, databases, mainframe devices, personal computing devices (e.g., laptops, desktops, tablet computers, smartphones, etc.), or other computing devices. In additional embodiments, the user device 120 can be a computing device of an end user that is attempting to access secondary domain data, primary domain data, or both. For example, the end user may access a website associated with the SDD server 130 and enter a domain name into a query text box, where the domain name is associated with a registrant that uses supplementary domain data services provided by the SDD server 130, as described in further detail below.

For the sake of providing a simplified example, FIG. 1 depicts a single user device 120. However, in various embodiments, multiple user devices of multiple users can utilize the SDD server 130. For example, multiple users using multiple user devices can access a website associated with the SDD server 130 and submit domain data requests for domain names associated with registrants that use the supplementary domain data services provided by the SDD server 130.

In some embodiments, the RDAP server 110 can represent one or more computing devices. For example, the RDAP server 110 can represent one or more webservers, databases, mainframe devices, or other computing devices. In additional embodiments, the RDAP server 110 can be a domain data server that maintains and manages primary domain data and responds to requests for domain data (e.g., requests for RDAP domain data). In further embodiments, the RDAP server 110 can be part of and/or associated with a domain name registry or a domain name registrar. In various embodiments, the primary domain data can be stored and/or provided in a format that includes human-readable text, such as the JavaScript Object Notation (JSON) format.

For the sake of providing a simplified example, FIG. 1 depicts a single RDAP server 110. However, in various embodiments, the SDD server 130 can retrieve primary domain data from multiple RDAP servers. For example, different RDAP servers can be associated with different TLDs and/or a TLD can be associated with multiple RDAP servers, and the SDD server 130 can determine and retrieve the primary domain data from the appropriate RDAP server based on, for example, the TLD of the requested domain name.

In some embodiments, the SDD server 130 can represent one or more computing devices. For example, the SDD server 130 can represent one or more webservers, databases, mainframe devices, or other computing devices. In additional embodiments, the SDD server 130 can be a server that provisions supplementary domain data, authenticates registrants, receives requests for domain data from one or more devices (e.g., the user device 120), retrieves primary domain data from one or more RDAP servers (e.g. the RDAP server 110), obtains supplementary domain data (e.g., from the SDD database 140), merges the primary domain data with the supplementary domain data, and provides the merged domain data to the one or more devices. In further embodiments, the SDD server can host a website that can be used by, for example, the user device 120 and/or a registrant to submit requests to provision and/or retrieve domain data.

In some embodiments, the SDD database 140 can represent one or more computing devices. For example, the SDD database 140 can represent one or more webservers, databases, mainframe devices, or other computing devices. In other embodiments, the SDD database 140 can be a database on the same device(s) as the SDD server 130. In some implementations, the SDD database 140 can be a database that maintains, manages, and provides supplementary domain data. In various embodiments, the supplementary domain data can be stored and/or provided in a format that includes human-readable text, such as the JSON format.

The system 100 described above is merely a simplified example of such a system. In various embodiments, the system 100 can include additional user devices, RDAP servers, SDD servers, SDD databases, etc. Additionally, the system 100 can include other computer network entities or website entities, such as, for example, domain name registries, domain name registrars, domain name resellers, name servers, recursive name servers, internet service providers, website servers, etc.

Figure 2:
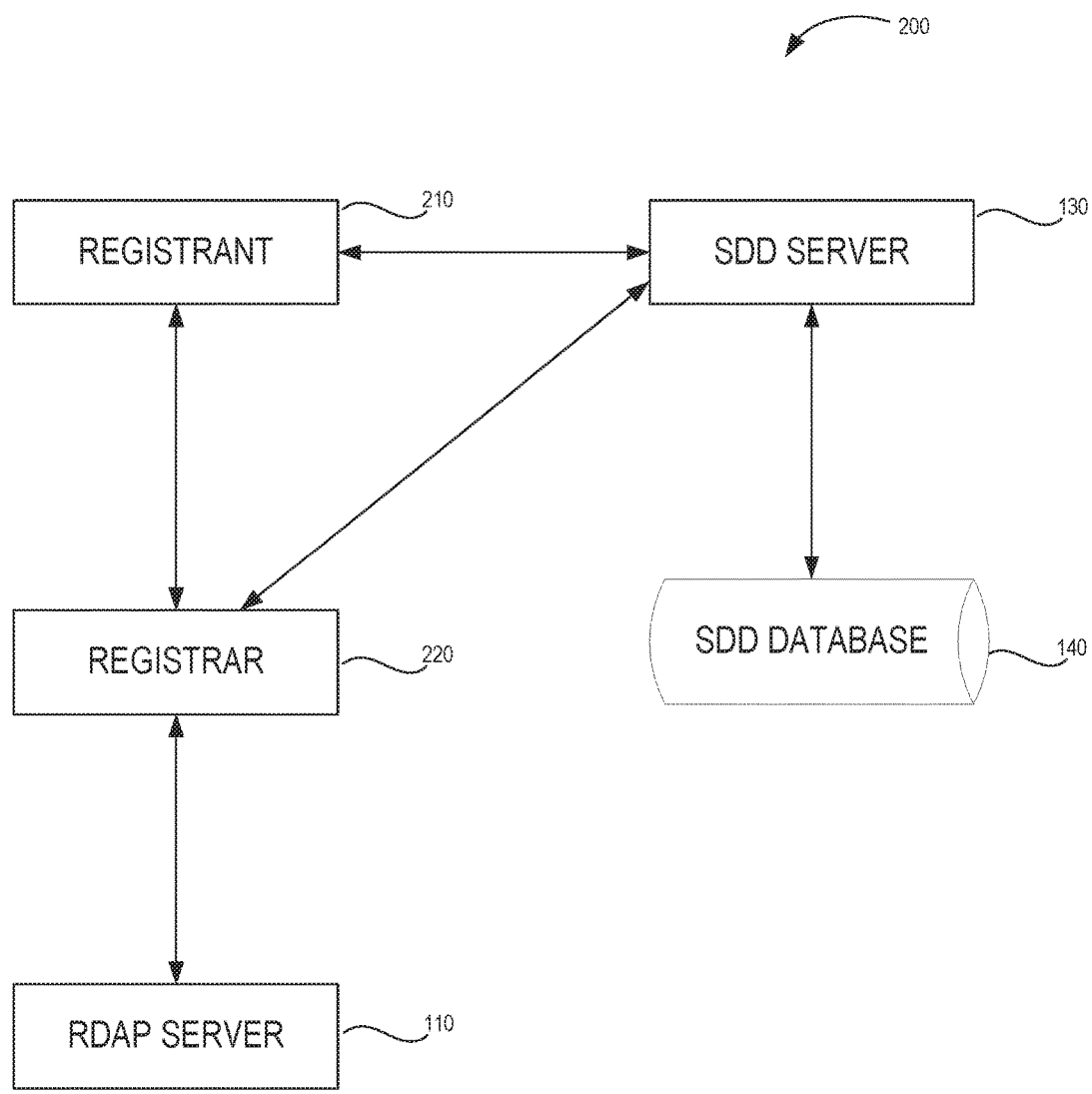
FIG. 2 is a diagram illustrating an example of a system for provisioning domain data, consistent with certain disclosed embodiments.

FIG. 2 is a diagram illustrating an example of a system 200 for provisioning domain data, consistent with certain disclosed embodiments. The system 200 can include a registrant device 210, a registrar 220, the RDAP server 110, the SDD server 130, and the SDD database 140.

In some implementations, the registrant device 210 can represent one or more computing devices. For example, the registrant device 120 can represent one or more webservers, databases, mainframe devices, personal computing devices (e.g., laptops, desktops, tablet computers, smartphones, etc.), or other computing devices. In additional embodiments, the registrant device 120 can be a computing device of an end user that registers and/or owns a domain name (i.e., a registrant). For example, the registrant can register a domain name using registrar 220 and utilize supplementary domain data services provided by the SDD server 130. In other embodiments, the registrant device 120 can be a computing device of end user authorized to act on behalf of the registrant.

For the sake of providing a simplified example, FIG. 2 depicts a single registrant device 210. However, in various embodiments, multiple registrant devices of multiple registrants can utilize the SDD server 130. For example, multiple registrants using multiple registrant devices can access a website associated with the SDD server 130 and submit supplementary domain data, authentication information, and/or authorization information, which the SDD server 130 can use to provision the supplementary domain data.

In some embodiments, the registrar 220 can represent one or more computing devices. For example, the registrar 220 can represent one or more webservers, databases, mainframe devices, or other computing devices. In some embodiments, the registrar 220 can be a domain name registrar that provides retail domain name registration and management services to registrants. The registrar 220 can, in some implementations, be accredited by a domain name registry and/or the Internet Corporation for Assigned Names and Numbers (ICANN) or vertically integrated with a domain name registry (not shown in FIG. 2). Accordingly, in such embodiments, management services provided by the registrar 220 are performed in accordance with guidelines designated by the domain name registry. The registrar 220 can, in further embodiments, purchase domain names "wholesale" from the domain name registry, sell domain names at retail to registrants, such as, for example, a registrant on the registrant device 210, or sell domain names via resellers.

In further embodiments, the registrar 220 can be a domain name registry that maintains an authoritative list of at least one TLD and publishes DNS TLD zones that are used to resolve domain name queries. In still further embodiments, the registrar 220 can be a domain name reseller that is not accredited as a registrar through a domain name registry and/or through ICANN, but that provides retail domain name registration and management services to registrants through an accredited registrar.

In some implementations, in response to registering a domain name, the registrar 220 can provide primary domain data to the RDAP server 110. Accordingly, RDAP server 110 can respond to domain data requests (e.g., RDAP domain data requests) for the registered domain name.

In still further embodiments, the registrar 220 can provide authentication services for registrants. For example, when a registrant registers a domain name, the domain name registrar 220 can generate or allow the registrant to create authentication information (e.g., a username/password combination, an authentication code, a certificate, a public/private key pair, etc.). In other examples, the registrar 220 can create or allow the registrant to create authentication information after the domain name is registered based on a request from the registrant, based on a request from an SDD server (e.g., the SDD server 130), etc.

Once the authentication information is created, the registrar 220 can receive requests to authenticate a registrant from an SDD server (e.g., the SDD server 130), where the request includes the authentication information provided by the registrant to the SDD server, the registrar 220 can verify whether the authentication information corresponds to the registrant, and the registrar 220 can transmit an indication of the results of the authentication back to the SDD server.

For the sake of providing a simplified example, FIG. 2 depicts a single registrar 220. However, in various embodiments, multiple domain name registrars, domain name registries, and/or domain name resellers can be used by the SDD server 130 to, for example, determine domain name availability, provide domain name suggestions, register user-selected domain names, and/or provide authentication services.

The system 200 described above is merely a simplified example of such a system. In various embodiments, the system 200 can include additional registrant devices, domain name registrars, RDAP servers, SDD servers, SDD databases, etc. Additionally, the system 200 can include other computer network entities or website entities, such as, for example, domain name registries, domain name resellers, name servers, recursive name servers, internet service providers, website servers, user devices of non-registrants, etc.

Figure 3:
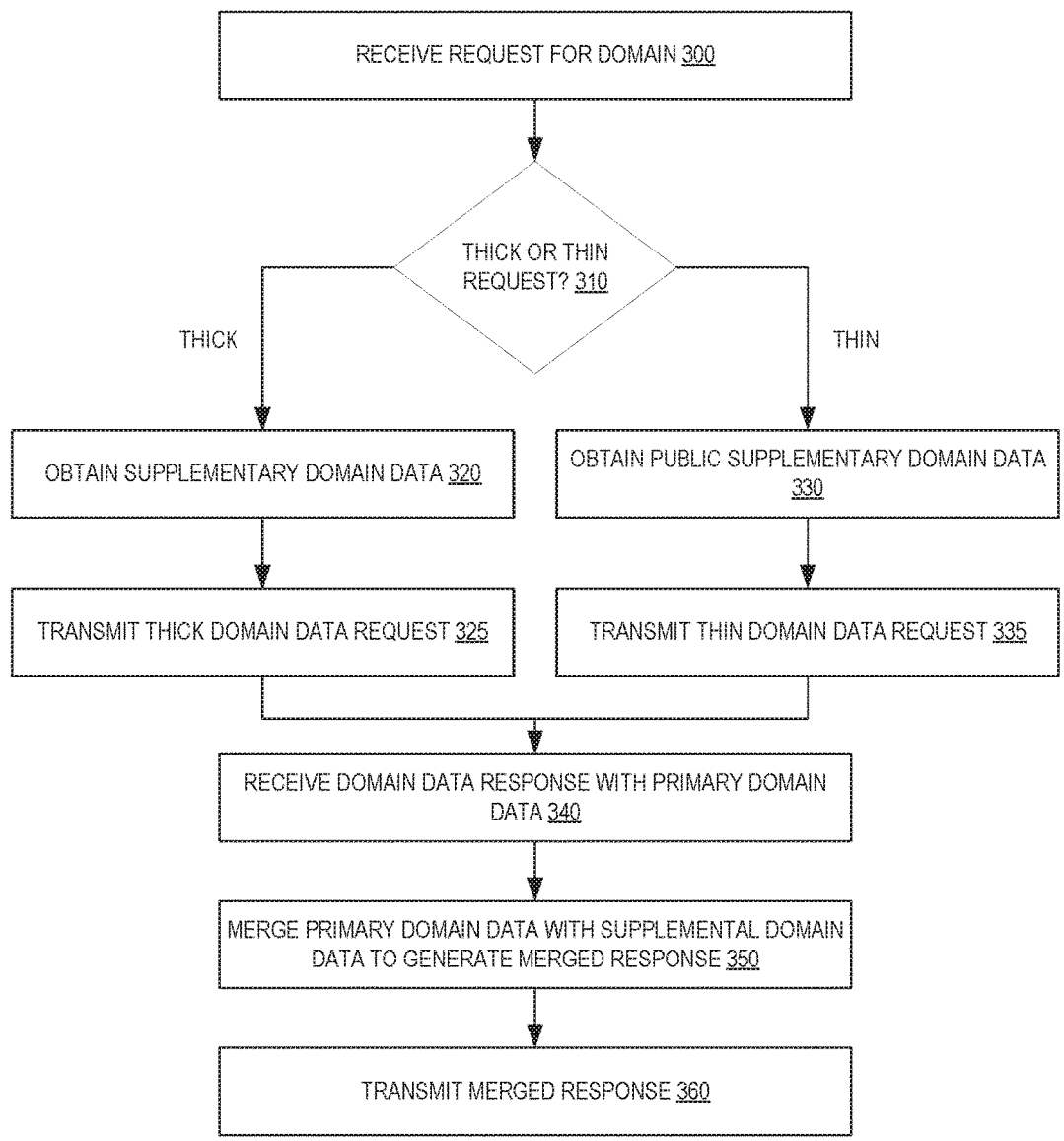
FIG. 3 is a flow diagram illustrating an example of a process for responding to a request for domain data, consistent with certain disclosed embodiments.

FIG. 3 is a flow diagram illustrating an example of a process for responding to a request for domain data, consistent with certain disclosed embodiments. In some embodiments, the method described in FIG. 3 can be performed using a computing device such as, for example, a webserver, a mainframe device, a personal computing device, etc.

In some implementations, the computing device can be, for example, an SDD server, such as, for example, the SDD server 130, described above with regard to FIGS. 1-2.

The process can begin in 300, when the computing device receives a request for domain data. In some embodiments, the request can include a domain name and a source address of the request. In further embodiments, the request can include access authorization information (e.g., a username/password combination, an authorization code, a certificate, a private key, etc.). In some implementations, the request can be in the form of a command line database query, while, in further implementations, the request can be received via a website associated with and/or hosted by an SDD server. For example, a user on a user device (e.g., the user device 120, shown in FIG. 1) can input the domain name as a string into a text box on the website. As a further example, the user can input the authorization information into one or more text boxes, by uploading a file (e.g., a certificate), etc.

An example of a command line database query can be: curl -k -H "Accept: application/json" http://rdap.labs.com/domain/statebank.bank? privilege=advanced -o out.json -v, where the request is for domain data associated with the domain name "statebank.bank," the request is from a source that has access to privileged domain data, and the request is a "thick" request. A "thick" request can be a request for additional domain data that is not provided in a "thin" request, such as, for example, a registrant's contact information and designated administrative and technical contact information.

In 310, the computing device can determine if the request is a thick request or a thin request. For example, if the request is a thick request, the response to the request can include public and privileged domain data, and if the request is a thin request, the response to the request may only include public domain data.

In some embodiments, a registrant of a domain name may be provided full control to restrict access to all supplementary domain data or individual items of domain data. For example, the domain data can include a domain resale object, that includes an indicator of whether an associated domain name is available for resale (e.g., as a BOOLEAN value), an indicator of whether the domain resale object is public or privileged, contact information associated with a resale (e.g., an email address, a phone number, a Uniform Resource Locator (URL), a street address, etc.), indicators of whether individual items of domain data within the domain resale object are public or privileged, and the like. Accordingly, the entire domain resale object can be public, the entire domain resale object can be privileged, the domain resale object can be public with individual items of domain data that are privileged (e.g., a street address associated with the resale object), the domain resale object can be privileged with individual items of domain data that are public (e.g., an indicator of whether an associated domain name is available for resale), etc.

If, in 310, the computing device determines that the request is a thick request (310: "THICK"), the computing device can, in 320, obtain supplementary domain data for the domain name associated with the request. In some embodiments, the computing device can retrieve the supplementary domain data from an SDD database (e.g., the SDD database 140, described above). For example, the supplementary domain data can be obtained from the database using representational state transfer (REST) web services. In further embodiments, the supplementary domain data may include privileged domain data. In still further embodiments, the supplementary domain data can be a file that includes human-readable text, such as a file corresponding to the JSON format.

For example, the supplementary domain data may include a resale object that is public, may indicate that resale is allowed, may include contact information associated with the resale object, and may be formatted as shown below:

```
{
    domain_resale: {
        access_type: "public",
        role: "registrant",
        status: "resaleAllowed true",
        jcard: {
            email: "kbeckman@statebank.bank",
            phone: "5551394302",
            url: http://domainsales.statebank.bank,
            address: [
                "25 Bank Ln",
                "Bank City",
                "VA",
                "25432",
                "US",
            ]
        }
    }
}
```

In some embodiments, if the request is a thick request, the computing device can verify whether the source of the request is authorized. If the source is not authorized, the request can be rejected or the request can be treated as a thin request. In some implementations, the request can be authorized based on authorization information included in the request (e.g., a source address for the request, an authorization code included in the request, etc.), while, in further implementations, the computing device can transmit a communication to the source requesting that authorization information be provided.

In 325, the computing device can transmit a thick domain data request for the domain name to a domain data server (e.g., the RDAP server 110, as described above). In other words, the computing device can transmit a request for the public and privileged primary domain data associated with the domain name that is stored and/or maintained by the domain data server.

If, in 310, the computing device determines that the request is a thin request (310: "THIN"), the computing device can, in 330, obtain the public supplementary domain data for the domain name associated with the request. In some embodiments, the computing device can retrieve the public supplementary domain data from an SDD database (e.g., SDD Database 140, described above). For example, the supplementary domain data can be obtained from the database using REST web services. In further embodiments, the obtained supplementary domain data may be a file that includes privileged domain data. However, the privileged supplementary domain data may not be included when primary domain data is merged with the supplementary domain data in 350, as described below. In still further embodiments, the public supplementary domain data can be retrieved as a file that is in the JSON format.

In 335, the computing device can transmit a thin domain data request for the domain name to a domain data server (e.g., RDAP server 110, as described above). In other words, the computing device can transmit a request for the public primary domain data associated with the domain name that is stored and/or maintained by the domain data server.

In 340, the computing device can receive a domain data response from the domain data server in response to the request. In some embodiments, the domain data response may include public and privileged primary domain data if the request was thick and may only include public primary domain data if the request was thin. In further embodiments, the domain data response can include a file in the JSON format.

For example, the domain data response may be formatted as shown below:
{
    rdapConformance: [ ],
    objectClassName: "domain",
    handle: "113435645",
    ldhName: "statebank.bank",
    lang: "en=US",
    links: [ ],
    port43: http://www.whois.com,
    status: [ ],
    events: [ ],
    entities: [ ],
    nameservers: [ ],
    notices: [ ],
    ext: [ ],
}

In 350, the computing device can merge the primary domain data received in the response in 340 with the supplementary domain data received in 320 or 330. In some embodiments, if the request was a thin request and the supplementary domain data obtained included privileged domain data, the privileged domain data may not be merged. In further embodiments, the merged domain data can be a file in the JSON format.

For example, the merged response may be formatted as shown below:

{
    rdapConformance: [ ],
    objectClassName: "domain",
    handle: "113435645",
    ldhName: "statebank.bank"

-continued lang: "en=US",
    links: [ ],
    port43: http://www.whois.com,
    status: [ ],
    events: [ ],
    entities: [ ],
    nameservers: [ ],
    notices: [ ],
    ext: {
        domain_resale: {
            access_type: "public",
            role: "registrant",
            status: "resaleAllowed true",
            jcard: {
                email: "kbeckman@statebank.bank",
                phone: "5551394302",
                url: http://domainsales.statebank.bank,
                address: [
                    "25 Bank Ln",
                    "Bank City",
                    "VA",
                    "25432",
                    "US",
                ]
            }
        }
    }
} where supplementary domain data is added to the primary domain data as extension (ext) data.

In 360, the computing device can transmit the merged response to the device that initiated the request in 300

While the steps depicted in FIG. 3 have been described as performed in a particular order, the order described is merely an example, and various different sequences of steps can be performed, consistent with certain disclosed embodiments. Additionally, the steps are described as discrete steps merely for the purpose of explanation, and, in some embodiments, multiple steps may be performed simultaneously and/or as part of a single computation. Further, the steps described are not intended to be exhaustive or absolute, and various steps can be inserted or removed.

Figure 4:
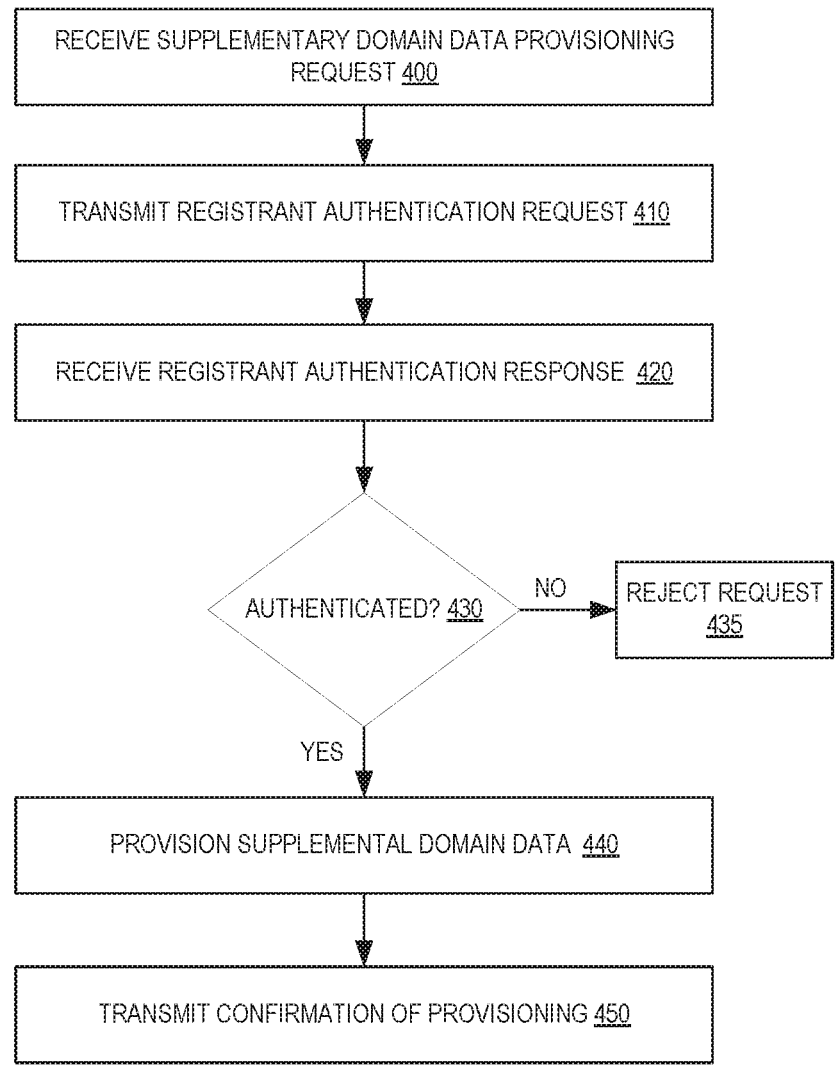
FIG. 4 is a flow diagram illustrating an example of a process for provisioning supplementary domain data, consistent with certain disclosed embodiments.

FIG. 4 is a flow diagram illustrating an example of a process for provisioning supplementary domain data, consistent with certain disclosed embodiments. In some embodiments, the method described in FIG. 4 can be performed using a computing device such as, for example, a webserver, a mainframe device, a personal computing device, etc.

In some implementations, the computing device can be, for example, a SDD server, such as, for example, the SDD server 130, described above with regard to FIGS. 1-2.

The process can begin in 400, when the computing device receives a supplementary domain data provisioning request. In some embodiments, the provisioning request can include a set of supplementary domain data, a domain name, and a source address of the request. In further embodiments, the provisioning request can include authentication information for authenticating that the source of the provisioning request is the registrant of the domain name or is authorized to act on behalf of the registrant, and/or authorization information for authorizing access to privileged domain data. In various embodiments, the authorization information and/or the authentication information can include at least one of a username/password combination, an authorization code, an authentication code, a certificate, a private key, etc.

In some implementations, the provisioning request can be in the form of a command line database add command, while, in further implementations, the provisioning request can be received via a website associated with and/or hosted by an SDD server. For example, a registrant on a registrant device (e.g., the registrant device 210, shown in FIG. 1) can input the domain name as a string into a text box on the website. As a further example, the user can input the supplementary domain data, authentication information, and/or authorization information into one or more text boxes, by uploading a file (e.g., a certificate, a JSON format file, etc.), and the like.

An example of a command line database add command can be:

curl -k -H "Accept: application/json"-X POST -d @ext statebank.bank?auth_md5-fira398ijf89aj89wf89j\&auth_seed=AIjfei39O -o out.json -v, where the request is to post extension data associated with the domain name "statebank.bank" and the request includes authentication information to authenticate that the source of the request is the registrant of the domain name.

In 410, the computing device can transmit a request to authenticate the source of the provisioning request. In some embodiments, the computing device can transmit a request to a domain name registrar associated with the domain name to verify that the source of the provisioning request is the registrant of the domain name or is acting on behalf of the registrant of the domain name. For example, the computing device can transmit authentication information that is included in the provisioning request or is otherwise associated with the provisioning request to the registrar.

In 420, the computing device can receive a response to the authentication request transmitted in 410. In 430, the computing device can process the response and determine whether the source of the provisioning request is authenticated.

If, in 430, the provisioning request is not authenticated (430: NO), then, in 435, the provisioning request can be rejected by, for example, performing no further action regarding the provisioning request or transmit a failure to authenticate to the source of the provisioning request.

If, in 430, the provisioning request is authenticated (430: YES), then, in 440, the computing device can provision the supplementary domain data. In some embodiments, the computing device can provision the supplementary domain data by storing the supplementary domain data (e.g., as a file in the JSON format) in an SDD database (e.g., the SDD database 140, as described above). In various embodiments, the SDD database can be stored on the computing device or can be part of a separate computing device.

In further embodiments, the computing device can store received authorization information (e.g., received with the provisioning request), that can be used to determine whether devices that request access to the supplementary domain data have access to privileged domain data.

In 450, the computing device can transmit a confirmation of the provisioning to the source of the provisioning request.

In some embodiments, the provisioned supplementary domain data can be updated or deleted using a similar process. For example, the computing device can receive a request to update the supplementary domain data, can authenticate the request, and then can modify the provisioned supplementary domain data based on the authentication. As a further example, the request can be a delete request, the computing device can authenticate the request, and then the computing device can delete some or all of the provisioned supplementary domain data based on the authentication.

In various embodiments, the update request and/or the delete request can be received in the form of command line database commands, via a website, etc. An example of a command line database delete command can be:

curl -k -H "Accept: application/json"-X DELETE @ext statebank.bank?auth_md5-fira398ijf89aj89wf89j\&auth_seed=AIjfei39O -o out.json -v, where the request is to delete extension data associated with the domain name "statebank.bank" and the request includes authentication information.

While the steps depicted in FIG. 4 have been described as performed in a particular order, the order described is merely an example, and various different sequences of steps can be performed, consistent with certain disclosed embodiments. Additionally, the steps are described as discrete steps merely for the purpose of explanation, and, in some embodiments, multiple steps may be performed simultaneously and/or as part of a single computation. Further, the steps described are not intended to be exhaustive or absolute, and various steps can be inserted or removed.

Figure 5:
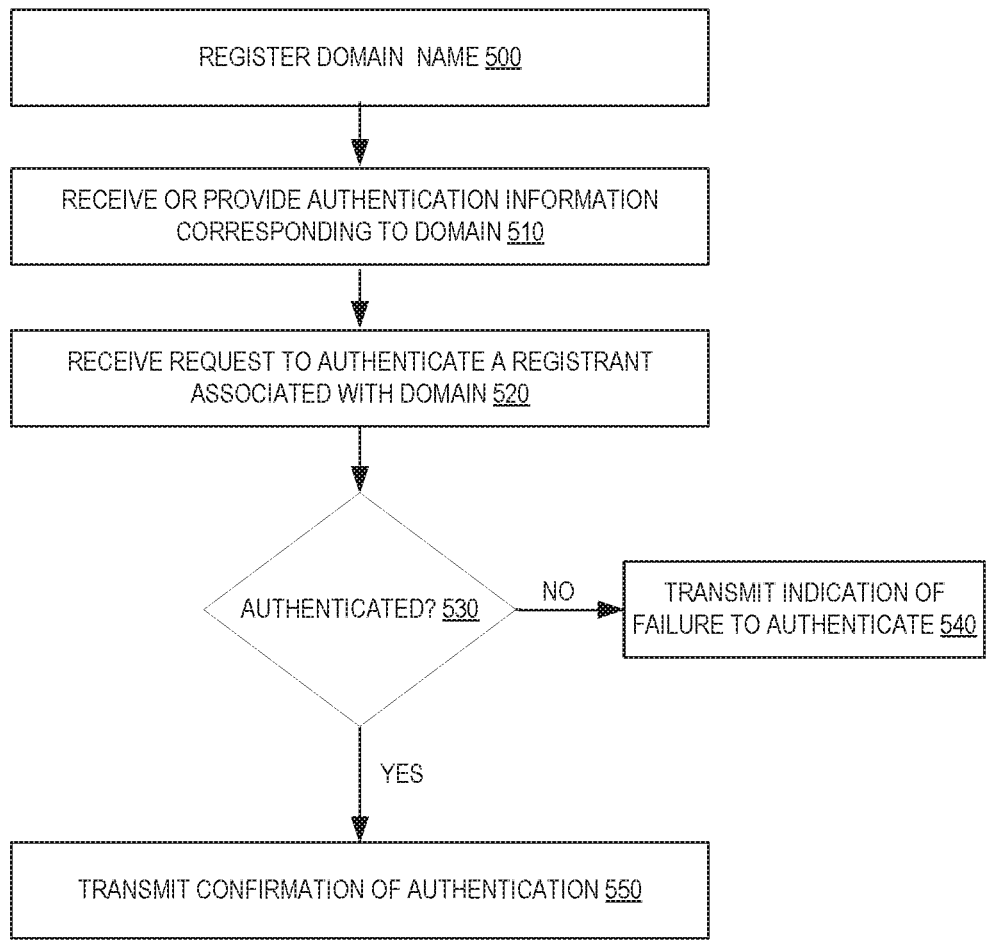
FIG. 5 is a flow diagram illustrating an example of a process for provisioning primary domain data, consistent with certain disclosed embodiments.

FIG. 5 is a flow diagram illustrating an example of a process for provisioning primary domain data, consistent with certain disclosed embodiments. In some embodiments, the method described in FIG. 5 can be performed using a computing device such as, for example, a webserver, a mainframe device, a personal computing device, etc.

In some implementations, the computing device can be, for example, a domain name registrar, such as, for example, the registrar 220, described above with regard to FIG. 2.

The process can begin in 500, when the computing device registers a domain name. In some embodiments, the computing device may receive a request to register a domain name from a registrant, and can submit a domain name add request to a domain name registry in response to the request to register the domain name. If the add request is not successful, the computing device can notify the registrant, and the registrant may submit a new domain name to register and the process can repeat until a domain name is successfully registered. If the add request is successful, in some embodiments, the computing device can notify the registrant.

In 510, the computing device can receive authentication from or provide authentication information to the registrant. In some embodiments, the computing device can provide an interface (e.g., a webpage) that allows the registrant to enter a username/password combination, an authentication code, a certificate, etc. In other embodiments, the computing device can generate the authentication information for the registrant and provide the authentication information (e.g., an authentication code, a certificate, a private key, etc.) to the user.

In some implementations, the computing device can receive authentication information prior to registering the domain name in 500. For example, the registrant may create an account with the computing device (e.g., by entering a username/password combination) and may log into the account to register the domain name. Accordingly, the computing device may provide and/or receive authentication information upon creation of the account, and the authentication information can be associated with any domain name registered using that account.

In 520, the computing device can receive a request to authenticate a registrant associated with a domain name, and the request can include authentication information. In some embodiments, the request can be received from an SDD server (e.g., the SDD server 130, as described above).

In 530, the computing device can determine, for example, if the authentication information associated with the request received in 520 matches the authentication information that is associated with the domain name. If, in 530, the authentication information matches, the request is authenticated (530: YES) and the computing device can, in 550, transmit a confirmation of the authentication to the device requesting authentication (e.g., the SDD server). If, in 530, the authentication information does not match, the request is not authenticated (530: NO) and the computing device can, in 540, transmit an indication of the failure to authenticate.

While the steps depicted in FIG. 5 have been described as performed in a particular order, the order described is merely an example, and various different sequences of steps can be performed, consistent with certain disclosed embodiments. Additionally, the steps are described as discrete steps merely for the purpose of explanation, and, in some embodiments, multiple steps may be performed simultaneously and/or as part of a single computation. Further, the steps described are not intended to be exhaustive or absolute, and various steps can be inserted or removed.

Figure 6:
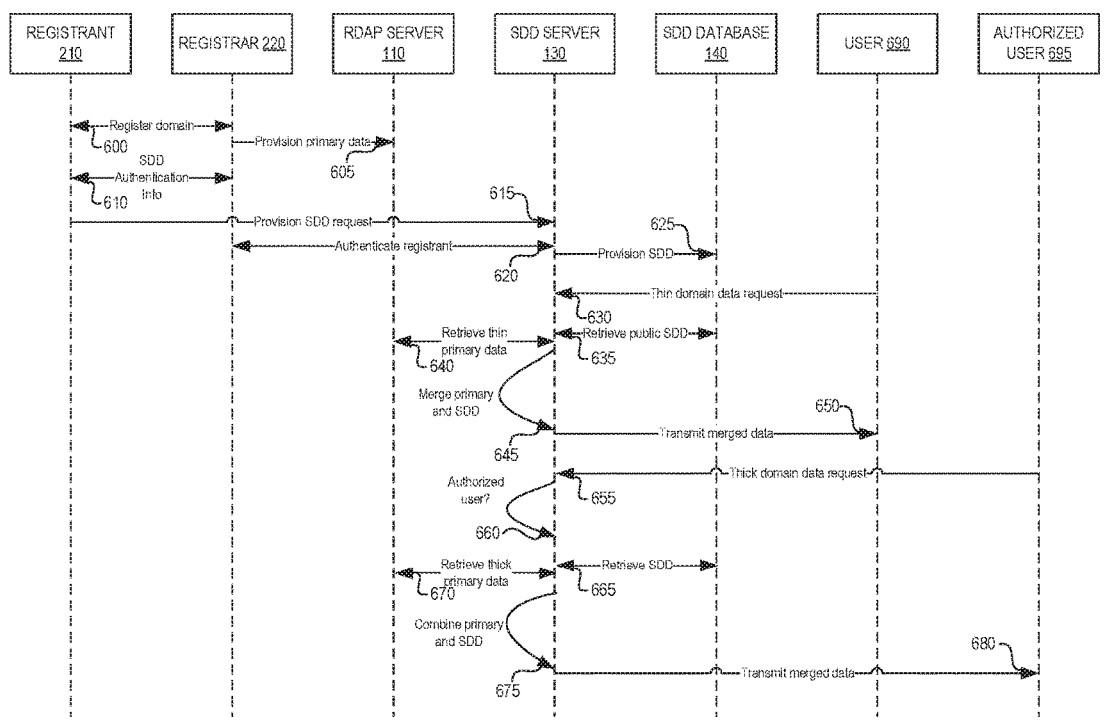
FIG. 6 is a flow diagram illustrating an example of a process for provisioning domain data and responding to requests for domain data, consistent with certain disclosed embodiments.

FIG. 6 is a flow diagram illustrating an example of a process for provisioning domain data and responding to requests for domain data, consistent with certain disclosed embodiments. In some embodiments, the process shown in FIG. 6 can be performed using the registrant device 210, the registrar 220, the RDAP server 110, the SDD server 130, and the SDD database 140, as described with regard to FIGS. 1-2. Additionally, in some embodiments, the process shown in FIG. 6 can additionally be performed using a user device 690 and an authorized user device 695.

The process can start in 600, when the registrant device 210 registers a domain name using registrar 220. For example, the registrant device 210 can request a domain name in a communication to the registrar 220, the registrar 220 can determine that the domain name is not available via communications with a domain name registry, the registrant device 210 can request a second domain name, and the registrar 220 can confirm that the second domain name is available and submit an add request to the domain name registry. As a further example, the registrar 220 can provide available domain name suggestions to the registrant device 210, the registrant device 210 can select one of the domain name suggestions for registration, and the registrar 220 can submit an add request to a domain name register with the selected domain name suggestion.

In 605, the domain name registrar 220 can provision primary domain data for the domain name registered in 600 by transmitting primary domain data to the RDAP server 110. In various embodiments, the transmitted domain data can include registrant contact information, administrative contact information, technical contact information, registration information, current status, date of creation, date of last update, date of registration expiration, name server addresses, etc.

In 610, the registrar 220 can receive or provide authentication information associated with the registered domain name to the registrant device 210. For example, the registrant device 210 can request an authentication code from the registrar device 220 to allow the registrant device 210 to use an SDD server to provision supplementary domain data, and the registrar 220 can generate and transmit the authentication code back to the registrant device 210. As a further example, the registrant device 210 can submit a username/password combination to the registrar 220 that can be used as authentication information associated with the registered domain name.

In 615, the registrant device 210 can transmit a supplementary domain data provisioning request to the SDD server 130. In some embodiments, the supplementary domain data provisioning request can include the domain name registered in 600, the domain data to store as supplementary domain data for the domain name, authentication information, and authorization information.

In 620, the SDD server can verify that registrant device 210 is authenticated using the authentication information by transmitting a request to the domain name registrar 220 to verify the authentication information. If the authentication information in the request matches the authentication information associated with the domain name, the domain name registrar can confirm that the registrant device 210 is authenticated.

In 625, based on determining that the registrant device 210 is authenticated, the SDD server 130 can provision the supplementary domain data by storing the supplementary domain data in the SDD database 140 (e.g., as a file in the JSON format) and by storing the authorization information.

In 630, the user device 690 can transmit a thin domain data request for the domain name to the SDD server 130. In 635, the SDD server 130 can retrieve public supplementary domain data from the SDD database 140 and, in 640, the SDD server 130 can transmit a thin domain data request to the RDAP server 110 and receive public primary domain data from the RDAP server 110.

In 645, the SDD server 130 can merge the supplementary domain data retrieved in 635 with the primary domain data retrieved in 640. In 650, the SDD server 130 can transmit the merged domain data to the user device 690.

In 655, the authorized user device 695 can transmit a thick domain data request for the domain name to the SDD server 130. In 660, the SDD server 130 can determining that the authorized user device 695 is authorized. For example, the thick domain data request may include authorization information and/or the authorized user device 695 may be associated with a network address (e.g., an Internet Protocol (IP) address, a port number, etc.) that is in a list of authorized network addresses associated with the domain name.

In 665, the SDD server 130 can retrieve supplementary domain data from the SDD database 140, including public and privileged supplementary domain data, and, in 670, the SDD server 130 can transmit a thick domain data request to the RDAP server 110 and receive public and privileged primary domain data from the RDAP server 110.

In 675, the SDD server 130 can merge the supplementary domain data retrieved in 665 with the primary domain data retrieved in 670. In 680, the SDD server 130 can transmit the merged domain data to the authorized user device 695.

The process described with regard to FIG. 6 is merely a simplified example of provisioning domain data responding to domain data requests, and the example is not intended to be limiting.

Figure 7:
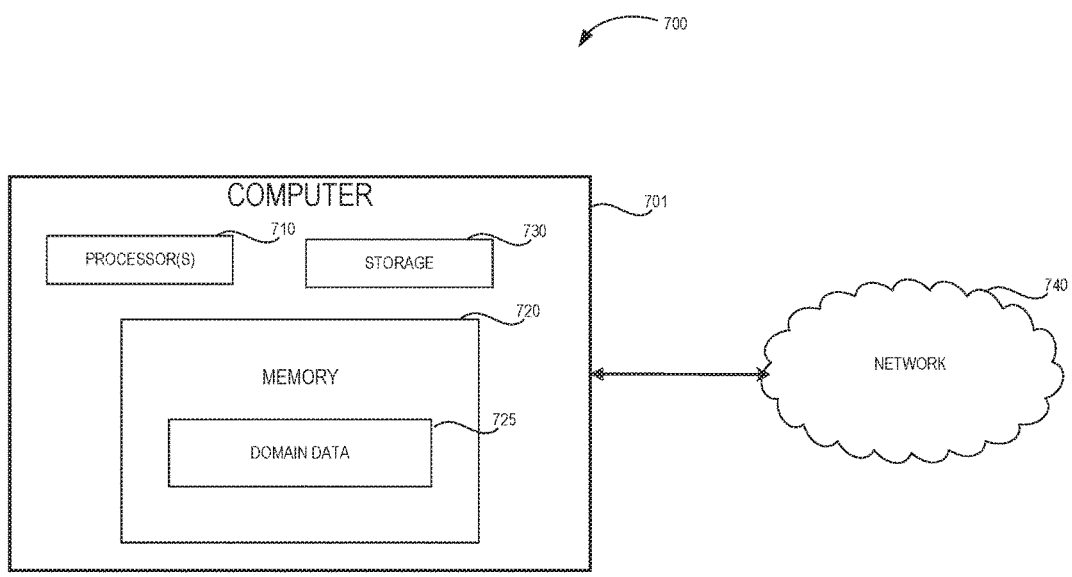
FIG. 7 is a diagram illustrating an example of a hardware system for providing improved RDAP operations, consistent with certain disclosed embodiments.

FIG. 7 is a diagram illustrating an example of a hardware system 700 for providing improved RDAP operations, consistent with certain disclosed embodiments. This example of the hardware system 700 includes specific examples of system components that may be used. The components and arrangement, however, may be varied.

A computer 701 may include a processor 710, a memory 720, a storage 730, and input/output (I/O) devices (not pictured). The computer 701 may be implemented in various ways and can be configured to perform any of the embodiments described above. In some embodiments, the computer 701 can be, for example, a desktop computer, a laptop, a tablet device, a mobile device (e.g., a smartphone), etc. In other embodiments, the computer 701 can be a computing device such as, for example, a database server, a web server, a website server, a mainframe computer, a distributed cluster of computing nodes and/or graphics processing units (GPUs), etc. In various embodiments, the computer 701 can be an RDAP server (e.g., the RDAP server 110), a user device (e.g., the user device 120, the user device 690, or the authorized user device 695), an SDD server (e.g., the SDD sever 130), an SDD database (e.g., the SDD database 140), a registrant device (e.g., the registrant device 210), a domain name registrar device (e.g., the registrar 220), etc. The computer 701 may be standalone or may be part of a subsystem, which may, in turn, be part of a larger system.

The processor 710 may include one or more known processing devices. The memory 720 may include one or more storage devices configured to store information and/or instructions used by the processor 710 to perform certain functions and operations related to the disclosed embodiments. The storage 730 may include a volatile or non-volatile, magnetic, semiconductor, tape, optical, removable, non-removable, or other type of computer-readable medium used as a storage device. In some embodiments, the storage 730 can include, for example, primary domain data, supplementary domain data, authorization information, authentication information, etc.

In an embodiment, the memory 720 may include one or more programs or subprograms including instructions that may be loaded from the storage 730 or elsewhere that, when executed by the processor 710, perform various procedures, operations, or processes consistent with disclosed embodiments. For example, the memory 720 may include domain data program 725 for responding to domain data queries, provisioning domain data, etc., according to various disclosed embodiments. The memory 720 may also include other programs that perform other functions, operations, and processes, such as programs that provide communication support, Internet access, etc. The domain data program 725 may be embodied as a single program, or alternatively, may include multiple sub-programs that, when executed, operate together to perform the function of the domain data program 725 according to disclosed embodiments. In some embodiments, the domain data program 725 can perform all or part of the processes of FIGS. 3-6, described above.

The computer 701 may communicate over a link with a network 740. For example, the link may be a direct communication link, a local area network (LAN), a wide area network (WAN), or other suitable connection. The network 740 may include the internet, as well as other networks, which may be connected to various systems and devices.

The computer 701 may include one or more input/output (I/O) devices (not pictured) that allow data to be received and/or transmitted by the computer 701. I/O devices may also include one or more digital and/or analog communication I/O devices that allow the computer 701 to communicate with other machines and devices. I/O devices may also include input devices such as a keyboard or a mouse, and may include output devices such as a display or a printer. The computer 701 may receive data from external machines and devices and output data to external machines and devices via I/O devices. The configuration and number of input and/or output devices incorporated in I/O devices may vary as appropriate for various embodiments.

Examples of uses of the system 700 can be described by way of example with reference to the embodiments described above.

While the teachings have been described with reference to the example embodiments, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A system comprising:
   one or more processors; and
   one or more computer-readable media, wherein the one or more computer-readable media contain instructions that, when executed by the one or more processors, cause the one or more processors to perform operations comprising:
   receiving, from a device, a request for domain data associated with a domain name;
   transmitting a domain data request to a domain data server associated with a domain name registry corresponding to the domain name;
   receiving a domain data response from the domain data server comprising primary domain data associated with the domain name;
   obtaining supplementary domain data associated with the domain name, wherein the supplementary domain data comprises data associated with the domain name that is retrieved from a database that is external to the domain data server;
   generating merged domain data by merging the primary domain data with the supplementary domain data; and
   transmitting the merged domain data to the device.

2. The system of claim 1, the operations further comprising:
   receiving, from a second device, a set of supplementary domain data comprising the supplementary domain data;
   receiving authentication information associated with the domain name;
   transmitting a registrant authentication request comprising the authentication information to a domain name registrar;
   receiving a response to the registrant authentication request; and
   provisioning the supplementary domain data based on the response indicating that the second device is authenticated.

3. The system of claim 2, the operations further comprising:
   receiving indications that at least one item of domain data in the set of supplementary domain data is public domain data and at least one item of domain data in the set supplementary domain data is privileged domain data.

4. The system of claim 3, wherein:
   the request for domain data is a thin request;
   the supplementary domain data that is obtained comprises the public domain data; and the domain data request transmitted to the domain data server is a thin domain data request.

5. The system of claim 3, wherein:
the request for domain data is a thick request;
the supplementary domain data that is obtained comprises the public domain data and the privileged domain data; and
the domain data request transmitted to the domain data server is a thick domain data request.

6. The system of claim 5, the operations further comprising receiving, from the second device, first authorization information, wherein:
the request for domain data comprises second authorization information;
obtaining the supplementary domain data associated with the domain name is in response to determining that the first authorization information matches the second authorization information; and
transmitting the domain data request to the domain data server is in response to determining that the first authorization information matches the second authorization information.

7. The system of claim 1, wherein the request for domain data is a request for RDAP domain data, and the domain data server is an RDAP server.

8. The system of claim 1, wherein one or more of the domain data response from the domain data server, the supplementary domain data, or the merged domain data are files in a JSON format.

9. The system of claim 1, wherein the supplementary domain data associated with the domain name is obtained by a server from a database located on the server.

10. The system of claim 1, wherein the supplementary domain data associated with the domain name is obtained, via representational state transfer web services, from the database that is external to the domain data server.

11. A method comprising:
receiving, from a device, a request for domain data associated with a domain name;
transmitting a domain data request to a domain data server associated with a domain name registry corresponding to the domain name;
receiving a domain data response from the domain data server comprising primary domain data associated with the domain name;
obtaining supplementary domain data associated with the domain name, wherein the supplementary domain data comprises data associated with the domain name that is retrieved from a database that is external to the domain data server;
generating, using one or more processors, merged domain data by merging the primary domain data with the supplementary domain data; and
transmitting the merged domain data to the device.

12. The method of claim 11, further comprising:
receiving, from a second device, a set of supplementary domain data comprising the supplementary domain data;
receiving authentication information associated with the domain name;
transmitting a registrant authentication request comprising the authentication information to a domain name registrar;
receiving a response to the registrant authentication request; and
provisioning the supplementary domain data based on the response indicating that the second device is authenticated.

13. The method of claim 12, further comprising:
receiving indications that at least one item of domain data in the set of supplementary domain data is public domain data and at least one item of domain data in the set supplementary domain data is privileged domain data.

14. The method of claim 13, wherein:
the request for domain data is a thin request;
the supplementary domain data that is obtained comprises the public domain data; and
the domain data request transmitted to the domain data server is a thin domain data request.

15. The method of claim 13, wherein:
the request for domain data is a thick request;
the supplementary domain data that is obtained comprises the public domain data and the privileged domain data; and
the domain data request transmitted to the domain data server is a thick domain data request.

16. The method of claim 15, further comprising receiving, from the second device, first authorization information, wherein:
the request for domain data comprises second authorization information;
obtaining the supplementary domain data associated with the domain name is in response to determining that the first authorization information matches the second authorization information; and
transmitting the domain data request to the domain data server is in response to determining that the first authorization information matches the second authorization information.

17. The method of claim 11, wherein the request for domain data is a request for RDAP domain data, and the domain data server is an RDAP server.

18. The method of claim 11, wherein one or more of the domain data response from the domain data server, the supplementary domain data, or the merged domain data are files in a JSON format.

19. The method of claim 11, wherein the supplementary domain data associated with the domain name is obtained via representational state transfer web services, from the database that is external to the domain data server.

20. A non-transitory computer readable storage medium comprising instructions for causing one or more processors to:
receive, from a device, a request for domain data associated with a domain name;
transmit a domain data request to a domain data server associated with a domain name registry corresponding to the domain name;
receive a domain data response from the domain data server comprising primary domain data associated with the domain name;
obtain supplementary domain data associated with the domain name, wherein the supplementary domain data comprises data associated with the domain name that is retrieved from a database that is external to the domain data server;
generate merged domain data by merging the primary domain data with the supplementary domain data; and
transmit the merged domain data to the device.

* * * * *